J. F. COURSON.
DRAFT GEAR.
APPLICATION FILED MAR. 25, 1913.
1,070,229.
Patented Aug. 12, 1913.
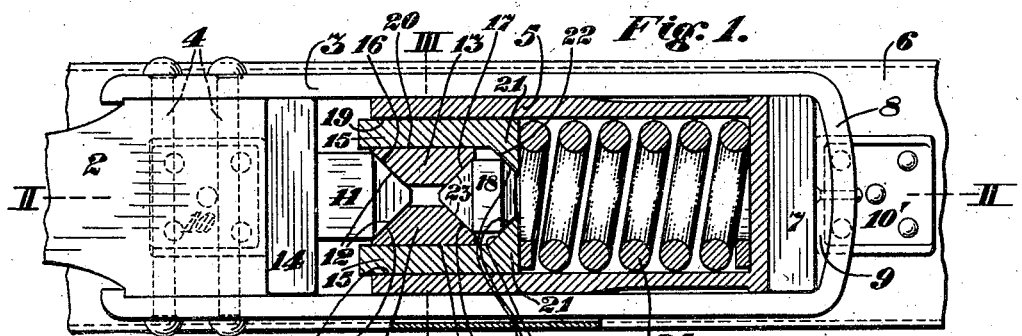
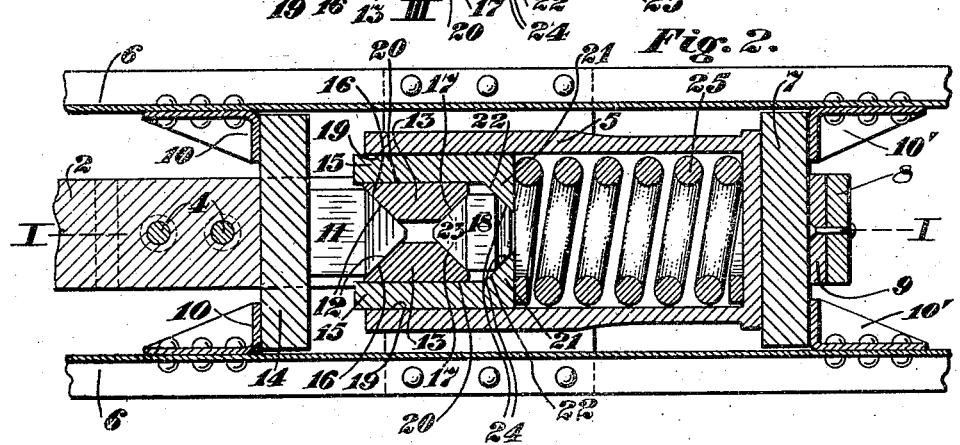
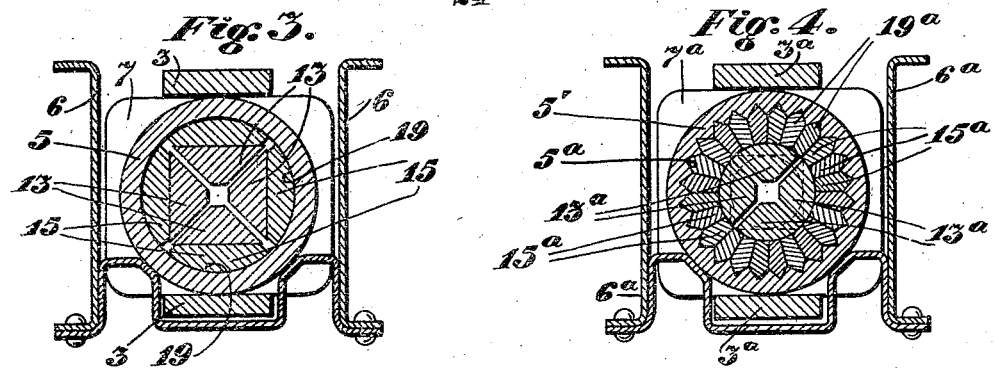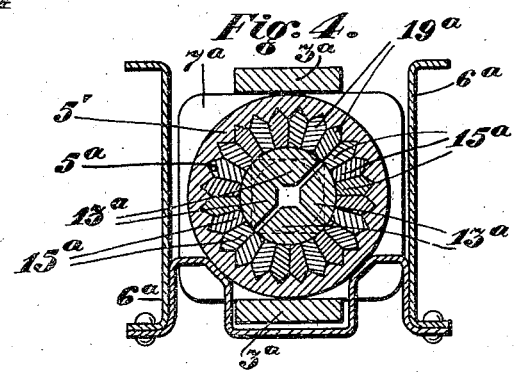
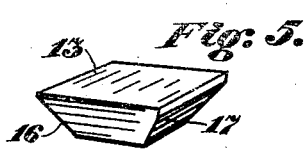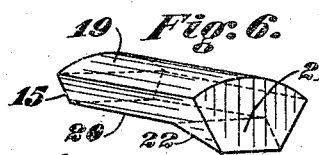
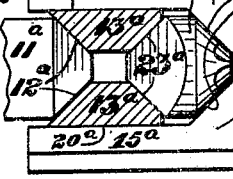
Witnesses:
Inventor:
John F. Courson

UNITED STATES PATENT OFFICE.

JOHN F. COURSON, OF PITCAIRN, PENNSYLVANIA.

DRAFT-GEAR.

1,070,229.

Specification of Letters Patent.  Patented Aug. 12, 1913.

Application filed March 25, 1913. Serial No. 756,692.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention consists of an improvement in friction draft gears for railway cars, etc., and it has for its object to provide a draft gear of simple construction and high efficiency, designed to utilize the wedging and releasing qualities of wedge blocks arranged between a central buffing member and surrounding friction members, and a pressure spring, within an inclosing casing, and adapted to transmit buffing and pulling strains to the car underframe.

The particular object of the present invention is to provide, in a friction draft gear of this type, means for exerting frictional resistance between the friction members and the casing, by the coöperating action of opposing wedge members adapted to equalize and multiply the strain and to transform it into frictional resistance, evenly throughout the length of the friction-creating members.

These objects are accomplished, in one preferred form of the apparatus, more fully hereinafter described, as illustrated in the accompanying drawings, in which—

Figure 1 is a central vertical sectional view of the complete draft gear assembled, the parts being shown in extended position, the section being indicated by the line I. I. of Fig. 2. Fig. 2 is a horizontal sectional view of the gear, the section being indicated by the line II. II. of Fig. 1. Fig. 3 is a cross sectional view, indicated by the line III. III. of Fig. 1. Fig. 4 is a similar cross sectional view, showing a modified construction having a plurality of closely assembled friction members engaging receiving grooves in the casing. Fig. 5 is a perspective detail view of one of the expanding wedge blocks. Fig. 6 is a similar view of one of the friction shoes. Fig. 7 is a similar view of one of the friction shoes used in the construction shown in Fig. 4. Fig. 8 is a detail view showing a modified construction of the inner terminal wedge used with the friction shoes of Figs. 4 and 7.

In the drawings 2 represents the drawbar of a coupler fixedly connected with the yoke 3 by transverse bolts 4 in the manner customary in this art, said yoke embracing the casing or cylinder 5 at top and bottom, as shown, the yoke and casing being located between the central sills 6, 6.

A bearing block or piece 7 is set against the rear end of cylinder 5, against the outer end of which block bears the rounded end 8 of yoke 3 with an interposed filling block 9, preferably secured to the end of the yoke. The front stops 10 extend inwardly from each side of the center sill 6, and sustain the pulling effect of the draft gear and impart it to said sills, while similar rear stops 10' act to receive and impart buffing strains in the same manner.

The central wedge block 11 has angularly disposed wedge faces 12 of pyramidal arrangement corresponding in number and degree of slope to the expanding wedges 13, said faces tapering inwardly toward the center at such an angle to the horizontal as to produce a maximum expansion with resulting free release. Wedge block 11 extends outwardly and bears by its main body portion against front follower plate 14, which plate in turn engages the rear end of drawbar 2 between the arms of yoke 3.

In the construction shown in the upper figures of the drawing, the expanding wedge blocks 13 are provided with outer flat faces which engage the inner flat faces of corresponding friction shoes 15, the wedge blocks 13 having at each end inwardly disposed angle faces 16 and 17 respectively, adapted to co-act with the faces 12 of the front central wedge 11, and with the faces of the inner wedge member 18.

The friction shoes 15, one for each expanding wedge block 13, are cylindrically rounded at their outer portions, as at 19, conforming to the inner surface of the casing 5 and adapted to make frictional engagement therewith. The inner faces 20 of friction shoes 15 are substantially parallel with their outer faces and with the longitudinal center of the gear, the inner portions of the friction shoes being deflected inwardly, as shown, providing an inner wedge terminal portion 21, having inner wedge faces 22 for co-action with the corresponding wedge faces of the inner central wedge 18. Said wedge 18 is provided at each end with series of forwardly disposed wedge faces 23 and rearwardly disposed wedge faces 24 respectively, adapted to engage wedge faces 17' and 22 respectively of the expanding wedge blocks 13 and friction shoes 15, as clearly shown.

A buffing spring 25 of well-known construction and function is interposed between the inner end of cylinder 5 and the rear ends of friction shoes 15, as clearly shown, the construction in this respect being similar to that shown in my prior Patent, No. 1011034, dated Dec. 5, 1911.

As will be seen from the above description and the drawings, the gear is composed of wedge blocks and co-acting friction shoes having contracting wedge faces all of substantially the same angle, having a high degree of expanding power and of sufficiently blunt slope to entirely prevent any tendency to stick in releasing at the termination of buffing or pulling strains.

The engaging faces between the friction shoes 15 and the casing, and between the friction shoes and the expanding wedge blocks 13, are substantially parallel with each other and with the axial center of the gear, thus avoiding any binding tendency, other than that exerted by the action of the main central wedge members 11 and 18. In operation, either in buffing or pulling, these wedges approach each other, due to the movement of the drawbar toward the casing, or vice versa, spring 25 thus being more or less compressed. The initial effect is to separate the expanding wedge blocks 13, which in turn expand the friction shoes 15 into binding engagement with the casing, the action being supplemented and largely assisted by the interengagement of friction faces 22 of the friction shoes and 24 of the inner wedge 18.

In compressing the gear, members 15 and 13 will have a slight longitudinal movement with relation to each other, the parts being maintained in tight engagement throughout at every stage of the operation, whatever the pressure may be, either in buffing or pulling. The expanding action of wedges 11 and 18 is thus transmitted directly, and through the interposed blocks 13 to the friction shoes 15, equally throughout their length, so that the friction shoes are thus pressed tightly against the inner surface of the casing to the same degree at all points of their length and circumferential width. Any tendency to tipping or undue strain or unequal pressure at any point is thus completely obviated and eliminated, due principally to the fact that the degree of slope or inclination of the wedge members is substantially the same throughout, and their operation is entirely independent of any supplemental or different wedge faces or members, as in the case of acute angle wedges. The absence of any acute angle wedges also completely obviates and overcomes any tendency to sticking or binding of the construction, thus insuring free and prompt release. Due to the arrangement of the wedge members and their uniformity and simultaneity of action, a full even bearing of the friction members is promptly exerted and uniformly maintained under whatever pressures may be exerted. The resulting friction, due to the construction, is also uniformly high and efficient.

Figs. 4, 7 and 8 illustrate a modified construction employing a considerable number of comparatively narrow friction shoe members 15$^a$ associated together in an annular series of closely adjacent, somewhat narrow segmental shaped sections, the friction-creating edges of which are V-shaped, as indicated at 19$^a$, and interfitting with corresponding shaped grooves 5$^a$ in the cylinder 5'. The inner edges 20$^a$ of the shoes 15$^a$ are arranged in circular form, adapted to engage the outer curved faces of the expanding wedge blocks 13$^a$. Said wedge blocks are arranged in operative relation to a central expanding wedge member 11$^a$ and an inner wedge member 18$^a$ having faces 12$^a$ and 23$^a$ respectively, and operable in the same manner as above described. The inner wedge member 18$^a$ is cylindrical as to its middle body portion and is provided with an inner cone extension 24$^a$, the faces of which correspond to the inner wedge portions 24 of the block previously described. The friction shoes 15$^a$ are each provided with inwardly extending lip projections 21$^a$ having inner flaring wedge faces 22$^a$, adapted to engage the cone 24$^a$ and to be actuated thereby. The operation of this construction is substantially similar to that using the pyramidal shaped wedge members, the construction providing for a multiplicity of friction surfaces and an increase of their operating area.

In each construction, it will be observed that, upon buffing pressure being exerted inwardly by the drawbar and front wedge 11, inward movement will be imparted to the friction shoe members by their inwardly overhanging lips or projections 21 engaging the inner wedge member. Such wedge member thus operates to pull the friction shoes inwardly of the casing by engaging their front portions and at the same time forcibly expanding these portions into operative engagement with the casing. The construction in this respect is also highly efficient in immediately causing an expanding action throughout all portions of the friction shoes and exerting an initial inward pulling or dragging action, in pulling. The inward pressure of spring 25, operating against the inwardly projecting ends 21 of the friction shoes, primarily causes an immediate expansion thereof by action against the inner wedge member 18, the outer portions of the shoes 15 being also promptly thrust into binding engagement.

While I have shown and described the wedge members as of substantially uniform degree, it will be understood that I do not desire to be limited exactly to these proportions, and that good results may be had by substantially conforming to the arrangement and design shown.

I am aware that opposing wedge members have been utilized between friction blocks having exterior friction surfaces in sliding and frictional engagement with the interior frictional surface of an inclosing shell or case, as in the patent of Moore 754674, but in such constructions the frictional engagement is directly between the principal wedge blocks and the casing itself. In my construction, the novelty consists in providing, between the wedge members and the casing, friction shoes having substantially parallel inner and outer faces and supplemental inwardly extending wedging terminals co-acting with one of such wedge members.

Having described my invention, what I claim is:

1. In a friction draft gear, the combination with the casing and the relatively movable drawbar, of friction shoes engaging the casing having inner substantially parallel faces and inwardly extending wedge portions, a central buffing wedge block, expanding wedge blocks between the friction shoes and said wedge block, and an inner wedge block having oppositely disposed faces engaging the adjacent faces of the expanding wedge blocks and of the wedge portions of the friction shoes, substantially as set forth.

2. In a friction draft gear, the combination with a casing and a relatively movable drawbar; of friction shoes engaging the casing having inner substantially parallel faces and inwardly extending wedge portions, a separating wedge having forwardly and rearwardly disposed wedge faces engaging said wedge portions by its rearwardly disposed wedge faces, a central buffing wedge block, and expanding wedge blocks having faces engaging the friction shoes, buffing wedge block, and the forwardly disposed wedge faces of the separating wedge respectively, substantially as set forth.

In testimony whereof I hereunto affix my signature in the presence of two witnesses.

JOHN F. COURSON.

Witnesses:
H. HECK,
C. M. CLARKE.

---

Copies of this patent may be obtained for five cents each, by addressing the "Commissioner of Patents, Washington, D. C."